United States Patent
Ladenburger (10) Patent No.: US 10,088,121 B2
(45) Date of Patent: Oct. 2, 2018

(54) MOTOR VEHICLE LAMP HAVING A LINEAR OR PLANAR PROJECTION IMAGE

(71) Applicant: Automotive Lighting Reutlingen GmbH, Reutlingen (DE)

(72) Inventor: Andreas Ladenburger, Ulm (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 14/580,387

(22) Filed: Dec. 23, 2014

(65) Prior Publication Data

US 2015/0184823 A1    Jul. 2, 2015

(30) Foreign Application Priority Data

Dec. 27, 2013    (DE) .......... 10 2013 227 195

(51) Int. Cl.
*F21V 7/00* (2006.01)
*F21V 5/00* (2018.01)
(Continued)

(52) U.S. Cl.
CPC .......... *F21S 48/2268* (2013.01); *F21S 41/24* (2018.01); *F21S 41/32* (2018.01); *F21S 43/14* (2018.01);
(Continued)

(58) Field of Classification Search
CPC .. F21S 48/236; F21S 48/2268; F21S 48/1329; F21S 48/1241; F21S 48/215;
(Continued)

(56) References Cited

U.S. PATENT DOCUMENTS 4,389,698 A * 6/1983 Cibie .................. G02B 6/0005
                                                    362/338
5,295,047 A * 3/1994 Windross ............. F21S 48/218
                                                    362/23.15
(Continued)

FOREIGN PATENT DOCUMENTS

CN          1619210 A      5/2005
CN        101959716 A      1/2011
(Continued)

OTHER PUBLICATIONS

Aug. 6, 2014 German Examination Report for Application No. 10 2013 227 195.6.
(Continued)

*Primary Examiner* — Erin Kryukova
(74) *Attorney, Agent, or Firm* — Howard & Howard Attorneys PLLC (57) ABSTRACT

A motor vehicle lamp is presented, having an elongated waveguide, which is configured to conduct light in its interior, via total internal reflection occurring on border surfaces of the waveguide, along a guidance line of the waveguide, predefined by the external shape of the waveguide and running inside the waveguide, wherein the waveguide has a light exit surface. The lamp is distinguished in that it has a focusing element, which lies in the light path of the light emitted via the light exit surface, and extends thereby over the entire length of the light exit surface, and is configured to reduce the beam width of the light bundle in which the light emitted from the light exit surface is propagated.

8 Claims, 7 Drawing Sheets

(51) Int. Cl.

| | | |
|---|---|---|
| *B60Q 1/00* | (2006.01) | |
| *B60Q 3/00* | (2017.01) | |
| *B60Q 11/00* | (2006.01) | |
| *F21V 9/00* | (2018.01) | |
| *F21V 7/04* | (2006.01) | |
| *G02B 6/00* | (2006.01) | |
| *G09F 13/00* | (2006.01) | |
| *F21S 8/10* | (2006.01) | |
| *F21V 8/00* | (2006.01) | |
| *F21S 41/24* | (2018.01) | |
| *F21S 41/32* | (2018.01) | |
| *F21S 43/14* | (2018.01) | |
| *F21S 43/20* | (2018.01) | |
| *F21S 43/237* | (2018.01) | |
| *F21S 43/245* | (2018.01) | |
| *F21S 43/249* | (2018.01) | |
| *F21S 43/247* | (2018.01) | |
| *F21S 43/31* | (2018.01) | |
| *F21S 43/40* | (2018.01) | |
| *F21S 43/50* | (2018.01) | |

(52) U.S. Cl.
CPC .......... *F21S 43/237* (2018.01); *F21S 43/245* (2018.01); *F21S 43/247* (2018.01); *F21S 43/249* (2018.01); *F21S 43/26* (2018.01); *F21S 43/31* (2018.01); *F21S 43/40* (2018.01); *F21S 43/50* (2018.01); *G02B 6/005* (2013.01)

(58) Field of Classification Search
CPC .... F21S 48/25; F21S 48/2231; G02B 6/0078; G02B 19/0028; G02B 6/001; G02B 6/0008; G02B 6/0075; G02B 6/0076; G02B 6/008
See application file for complete search history.

(56) References Cited

U.S. PATENT DOCUMENTS

| | | | | | |
|---|---|---|---|---|---|
| 5,347,435 | A * | 9/1994 | Smith | | B60Q 1/302 340/479 |
| 5,400,225 | A * | 3/1995 | Currie | | B60Q 1/0011 362/554 |
| 5,418,384 | A * | 5/1995 | Yamana | | G02B 6/0046 257/443 |
| 5,590,945 | A * | 1/1997 | Simms | | B60Q 3/004 362/23.16 |
| 5,984,497 | A * | 11/1999 | Foerstner | | B60Q 1/0011 362/511 |
| 6,097,549 | A * | 8/2000 | Jenkins | | B60Q 1/302 359/726 |
| 6,584,714 | B1 * | 7/2003 | Wehrmann | | G02B 6/001 40/542 |
| 7,290,906 | B2 * | 11/2007 | Suzuki | | B60Q 1/2696 362/328 |
| 8,328,403 | B1 * | 12/2012 | Morgan | | G02B 6/26 362/606 |
| 9,170,361 | B2 * | 10/2015 | Zheng | | G02B 6/0028 |
| 9,340,149 | B2 * | 5/2016 | Domini | | G02B 6/001 |
| 9,664,375 | B2 * | 5/2017 | Guiset | | F24C 7/083 |
| 2003/0006230 | A1 * | 1/2003 | Kaji | | G02B 6/001 219/620 |
| 2003/0026106 | A1 * | 2/2003 | Knaack | | B60Q 1/0052 362/511 |
| 2004/0264188 | A1 * | 12/2004 | Tazawa | | F21V 5/04 362/257 |
| 2006/0171137 | A1 * | 8/2006 | Tamaki | | G01D 11/28 362/23.15 |
| 2008/0252986 | A1 * | 10/2008 | Ijzerman | | G02B 6/005 359/641 |
| 2009/0027911 | A1 | 1/2009 | Misawa et al. | | |
| 2009/0034278 | A1 * | 2/2009 | Tessnow | | F21S 48/1154 362/511 |
| 2009/0190370 | A1 * | 7/2009 | Luecke | | G02B 6/001 362/554 |
| 2011/0013411 | A1 | 1/2011 | Sakiyama et al. | | |
| 2012/0069592 | A1 * | 3/2012 | Natsume | | B60Q 1/0052 362/511 |
| 2012/0250342 | A1 * | 10/2012 | Reuschel | | B60K 37/00 362/488 |
| 2013/0003399 | A1 | 1/2013 | de Lamberterie | | |
| 2013/0083550 | A1 * | 4/2013 | Ishigami | | B60Q 3/023 362/511 |
| 2013/0201709 | A1 * | 8/2013 | Natsume | | B60Q 1/00 362/511 |
| 2013/0229815 | A1 * | 9/2013 | Pfeil | | G02B 6/001 362/493 |
| 2014/0036522 | A1 * | 2/2014 | Nakada | | F21S 48/00 362/511 |
| 2014/0140088 | A1 * | 5/2014 | Griebel | | B60Q 1/38 362/555 |

FOREIGN PATENT DOCUMENTS

| | | |
|---|---|---|
| DE | 35 42 292 A1 | 7/1986 |
| DE | 199 04 644 A1 | 8/2000 |
| DE | 103 14 257 A1 | 10/2004 |
| DE | 103 14 357 A1 | 10/2004 |
| DE | 10 2006 037 797 A1 | 2/2008 |
| DE | 10 2009 012 224 A1 | 12/2009 |
| DE | 10 2010 012 745 A1 | 9/2011 |
| DE | 10 2011 001 769 A1 | 10/2012 |
| DE | 10 2012 106 472 A1 | 1/2014 |
| DE | 10 2012 108 311 A1 | 3/2014 |
| EP | 2 541 128 A2 | 1/2013 |
| FR | 2 934 353 A1 | 1/2010 |
| JP | 2005-285667 A | 10/2005 |
| JP | 2010-170806 A | 8/2010 |
| WO | 2012/120441 A1 | 3/2012 |
| WO | 2013/120124 A2 | 2/2013 |

OTHER PUBLICATIONS

Official Search Report dated Jul. 20, 2015 in European Application No. 14193646.8.
First Office Action for Chinese Patent Application No. 201410816053.0 dated Dec. 4, 2017.

* cited by examiner

MOTOR VEHICLE LAMP HAVING A LINEAR OR PLANAR PROJECTION IMAGE

CROSS-REFERENCE TO RELATED APPLICATION

This application is based upon and claims priority to German Patent Application No. 102013227195.6, filed on Dec. 27, 2013.

BACKGROUND OF THE INVENTION

1. Field of the Invention

The present invention relates, generally, to motor vehicle lighting and, more specifically, to a motor vehicle lamp having an elongated waveguide configured to conduct light in its interior, via total internal reflection occurring on border surfaces of the waveguide, along a guidance line of the waveguide predefined by the external shape of the waveguide and running inside the waveguide, wherein the waveguide has a light exit surface.

2. Description of the Related Art

Motor vehicle lamps are known in the related art and may include an elongated waveguide configured to conduct light in its interior via total internal reflection occurring on border surfaces of the waveguide, along a guidance line of the waveguide predefined by the external shape of the waveguide and running inside the waveguide, wherein the waveguide has a light exit surface. By way of example, reference is made to "rod-shaped" waveguides, wherein a rod-shaped waveguide is understood here to be a waveguide, the length of which, measured in the direction of light transportation, is a multiple of its measured dimensions transverse to the direction of light transportation, which can be referred to as the width or thickness in order to distinguish from the term "length." The rod-shape can be straight or curved in space, as is known, for example, from annular daytime running light lamps used in connection with automotive vehicle lighting.

In addition, there are numerous motor vehicle lamps known in the related art which utilize waveguides to generate a light distribution necessary for their function. Typically, waveguides are supplied with light generated by semiconductor light sources, such as light emitting diodes or laser diodes. The light enters the rod-shaped waveguide at one or more locations and is conducted further with minimal losses due to total internal reflection occurring on walls of the waveguide. Numerous optical light emitting elements deflect a portion of the light such that light strikes a border surface at such a steep angle that the light no longer experiences total internal reflection at that point, but rather exits the waveguide and contributes accordingly to the light distribution. If a projection image is to be obtained that is homogenous to the greatest possible extent, the waveguide is designed such that the size of the light emitting element increases over the course of the wave guide as the distance to the location where the light enters increases.

Generally, it is important that the emitted light is focused to a certain extent, in particular for the functions of daytime running lights and blinkers. Government-mandated regulations frequently require light generation to conform certain light distribution parameters, in particular minimum brightness values need to be obtained in certain spatial angular ranges. For example, a light emitting diode having a flat light exit surface emits light in a half-space, such as in an angular range of −90° to +90° vertically as well as horizontally, wherein the surface norm for the light exit surface of the light emitting diode is perpendicular to the vertical axis and perpendicular to the horizontal axis. A signal light distribution conforming to government-mandated automotive regulations may only require, in contrast, certain brightness values in an angular range of −20° to +20° horizontally and −10° to +10° vertically, wherein in each case the angles are to relate to a main beam direction of the lamp parallel to the longitudinal axis of the motor vehicle. In order to concentrate the light from the light source into an angular range of this size, the cross-section profile of the waveguide lying transverse to the main beam propagation direction of the light in the waveguide may be curved in a front region, or may be designed with a radius. The front region is the region that forms the light exit surface of the waveguide. The light generated with the light emitting elements is bundled by light refraction occurring when light exits this surface.

Because of the rounded or curved light exit surface of the waveguide, which is normally accompanied by a round cross-section of the overall waveguide (in particular, circular or elliptical), certain limits to the design necessarily arise in designing the motor vehicle lamps. Thus, tradeoffs inherently arise between the optical function and the optical effect when considering design guidelines for waveguides with a circular or elliptical cross-section. Moreover, a guidance line or central fiber of the waveguide (the curve in space that the waveguide is to follow) cannot be arbitrary. A minimum radius needs to be maintained in order to ensure that light will continue to be conducted via total internal reflection. If the guidance line has a small radius, light propagated inside the waveguide tends to strike the walls at a steeper angle than when the guidance line has a larger radius, which can lead to an undesired light emission. This minimum radius relates, linearly, to the diameter of the waveguide cross-section. A thicker waveguide needs to have a guidance line having larger minimum radii. The desired bundling effect requires a certain minimum width of the waveguide. Furthermore, the width of the waveguide (or the cross-section of the waveguide, respectively) cannot be arbitrarily varied along the course of the guidance line, because the transportation of the light via internal total reflection needs to remain intact. For example, a tapering of the waveguide cross-section leads to an expansion of the beam width of the light bundle in which the light is propagated in the waveguide. As a result, the angle of incidence for the light on the border surfaces is steeper and thus, an undesired increase in the emission probability results.

If the waveguide is to produce a light projection image that is homogenous to the greatest possible extent, such that that the course of the brightness over the entire length of the light exit surface is constant to the greatest possible extent, a portion of the light at the end of the waveguide frequently remains unused. Thus, unused light then exits at the end of the waveguide, resulting in undesired bright regions. Hiding these light exit points is frequently impractical due to spatial restrictions. A deeper cut of the light emitting element into the waveguide (which would enable a stronger emission of the light in desired spatial directions) resolves this problem only to a limited extent, because the focusing function of the curved front surface is weakened thereby. Furthermore, this results in an altered light impression at this location with respect to neighboring locations. Similarly, a conical tapering of the entire waveguide profile toward the end is possible only to a limited extent because the conditions for total internal reflection of the then expanding light bundle are no longer maintained. This then results in undesired light emission.

While vehicle lamps known in the related art have generally performed well for their intended purpose, there remains a need in the art for a motor vehicle lamp which that effects concentration of light in a predefined spatial angular range and, at the same time, allows for improved design flexibility.

SUMMARY OF THE INVENTION

The present invention overcomes the disadvantages in the related art in a motor vehicle lamp having an elongated waveguide. The waveguide is configured to conduct light in its interior, via total internal reflection occurring on border surfaces of the waveguide and along a guidance line of the waveguide. The guidance line runs inside the waveguide and is predefined by an external shape of the waveguide. The waveguide also has a light exit surface which is straight-lined in a spatial direction lying transverse to the guidance line. The lamp also includes a focusing element that lies in a light path of light emitted via the light exit surface, extends thereby over an entire length of the light exit surface, and is configured to reduce the beam width of the light bundle in which the light emitted from the light exit surface is propagated.

In this way, light is focused by the further optical element downstream of the waveguide in the light path, which could be a cylindrical lens or a reflector. Thus, the waveguide no longer has to focus the light to the same extent (or at all) thus leading to opportunistic degrees of freedom. Because the focusing element is optically decoupled from the waveguide, there is greater freedom in terms of the design with the motor vehicle lamp of the present invention than exists with conventional motor vehicle lamps.

In one embodiment, when viewed from the subsequent focusing optical element in the light path, the light exit surface exhibits a convex curvature in planes transverse to the guidance line. With this design, the light exit surface of the waveguide still has a focusing effect, but is not solely responsible for focusing the light. The optical function of the focusing is divided in this design between the waveguide and the subsequent optical element in the light path.

In one embodiment, the light exit surface of the waveguide runs in a spatial direction lying transverse to the guidance line, in a straight line. In this case, the light exit surface of the waveguide plays no role in focusing the light. By reducing and/or freeing the waveguide of the optical function of focusing the light, the guidance line that the waveguide should follow is subjected to limitations to a lesser extent than would be in the case with a waveguide having a curved exterior as known in the prior art. Due to the elimination of the bundling function, the actual waveguide can be thinner in the invention than with what is known in the prior art. In this way, a smaller minimum radius for its guidance line is obtained, and which needs to be maintained in order to sustain total internal reflection. Thus, the light path can thus have stronger changes in direction than is possible with a conventional waveguide and, in particular, a smaller curvature radii. The width of the line that is to be illuminated can be varied arbitrarily therealong so long as the focusing element is adapted accordingly. In comparison with the prior art, the thinner waveguide of the present invention remains unaffected thereby, such that the conveyance of the light by internal total reflection remains ensured.

In one embodiment, the waveguide cross-section lying transverse to the guidance line is rectangular. This improves the efficiency of the optical system in that if the waveguide is to have a projection image that is homogenously bright to the greatest possible extent (in which the brightness remains uniform over the entire length to the greatest possible extent) a waveguide having a rectangular cross-section is advantageous. In differing from round waveguide cross-sections, in which a portion of the light frequently remains unused at the end of the waveguide, all of the light can be used in the emission with a rectangular waveguide cross-section, because a rectangular waveguide can be tapered in steps ending in a point.

A deeper cutting of the light entry element into the waveguide is not problematic with a rectangular waveguide because there is no focusing effect to be lost. This also does not result in a different light impression at this point. An increased size in the light emitting element as the distance to the location where the light enters can be implemented better with rectangular waveguides than with round waveguides.

If a line course needs be composed of numerous waveguides, thin waveguides having a rectangular cross-section are advantageous. Here, the waveguide is regarded as thin, in particular if it appears to be thin in relation to the surface that is to be illuminated. This is the case, for example, if the length of the surface to be illuminated is a multiple of its width. Thus, the waveguides can be more readily disposed adjacent to one another, or behind one another, than is the case with round waveguides. The rectangular shape of the waveguide has the advantage, in particular, that two waveguides can run adjacent to one another, and the combined light emission looks like the light emission of a single waveguide.

By using thinner rectangular waveguides in combination with the focusing optical element, it is possible to combine long contours of numerous waveguides without difficulty. Moreover, it is possible to create closed or open annular contours, Y-shaped contours, multi-function waveguides, and animated waveguides such as sweeping blinkers. If a contour or a surface is to be illuminated with numerous waveguides, a rectangular and thinner waveguide is likewise advantageous. The combination of two waveguides to form a long waveguide functions better with a rectangular waveguide because it can end in a point over the course of numerous steps. The second waveguide can then enter the spatial region that is not occupied by the first waveguide due to the step-like tapering of the first waveguide.

With closed contours, annular contours, or Y-shaped contours, the thin rectangular waveguides can pass by one another more readily. Here, "passing by one another" means that the thin waveguides run adjacent to one another with the smallest possible spacing between them. To that end, the light exit surfaces of waveguides that are adjacent can be combined to form a homogenously brightly illuminated overall surface, with as few gaps as possible.

Advantageously, the subsequent optical element in the light path is a transparent solid body and contains a planar light entry surface and a light exit surface that emerges in a convex manner with respect to the optically thinner surroundings, in planes lying in the cross-section of the waveguide that are perpendicular to the guidance line of the waveguide. In this embodiment, the focusing function is fulfilled by the inner surface of the focusing element facing the light exit surface of the waveguide. This has the advantage that the light exit surface of the additional focusing element facing the observer can be flat, which is desirable from a design perspective.

In one embodiment, the subsequent optical element in the light path is a transparent solid and contains a light entry surface that emerges in a convex manner from the optically thinner surroundings, and a planar light exit surface, in planes lying in the cross-section of the waveguide that are perpendicular to the guidance line of the waveguide. The subsequent optical element in the light path may be a hollow reflector disposed such that it is illuminated by the light exiting the waveguide. Moreover, the subsequent optical element in the light path may be configured and disposed such that it does not alter the mean propagation direction of the incident light bundle from the waveguide. Further, the subsequent optical element in the light path may be configured and disposed such that it alters the mean propagation direction of the incident light bundle from the waveguide. Further still, the subsequent optical element in the light path may be a combination of a reflector and a transparent solid, sometimes referred to as a catadioptric lens. The reflector may exhibit a white or diffused scattering reflection surface. The lamp may have at least one first elongated waveguide and one second elongated waveguide and a common focusing element for both waveguides.

In some cases, waveguide contours are also composed of numerous waveguides. One reason for a combination of numerous waveguides is that a very long waveguide contour, particularly with waveguides for white light (such as daytime running lights) is problematic because a color shift occurs, where white light from light emitting diodes primarily exhibits blue and yellow spectrum components and the blue spectrum component is more strongly absorbed in waveguide materials than the yellow component. As a result, a yellow shift in the emitted light occurs in the course of the waveguide. This undesired effect appears even stronger as the length of the waveguide is increased. Thus, if a longer waveguide is replaced by two shorter waveguides, the yellow color impression at the end is avoided. Advantageously, both the first waveguide as well as the second waveguide have a rectangular cross-section, and the two waveguides are disposed successively in the longitudinal direction in the light path, in front of the shared focusing element. Each waveguide may have its own light entry surface, in front of which a light source is disposed that supplies light to the respective waveguide. Furthermore, the lamp may have two waveguides running in the direction of the light emitted from the waveguide in front of the focusing element, in which the light is propagated in opposing directions, and that run adjacent to one another in at least one section of their length, wherein the waveguides pass one another tangentially in opposing directions.

Combinations of numerous waveguides are used to generate closed or annular waveguide contours. Because a light emission in a desired direction only then functions if the light in the waveguide extends with a directional component that is parallel (and not antiparallel) to the desired direction of the emitted light, closed contours (which may exist in space at an arbitrary angle in motor vehicle lamps for design reasons) need to be composed of at least two waveguides. Single-part solutions with integrated deflection units exhibit deficits in the homogeneity of the appearance.

Combinations of numerous waveguides are also used for generating Y-shaped waveguide contours, as well as to create multi-functional waveguides (where both a first light distribution as well as a second light distribution are generated). For example, the light in a first light distribution is supplied to the waveguide via a first branch of the Y-configuration, and the light for the second light distribution is supplied to the waveguide via a second branch of the Y-configuration. Furthermore, combinations of numerous waveguides are also used to create so-called "animated" waveguides, such as a sweeping blinker light as a sequential light with which a light supply for numerous waveguides is activated in a temporally staggered way.

The lamp may include a slot aperture having an elongated aperture which runs over the section of the length in front of the light exit surfaces of the two waveguides passing by one another. The aperture of the slot aperture may run beyond of the section in front of the light exit surface of at least one of the two waveguides. Further, the aperture of the slot aperture may have a constant width over the length of the aperture.

Further advantages can be derived from the following description, the drawings, and the dependent claims. It is to be understood that the aforementioned features and the features that are to be explained below can be used not only in the respective given combinations, but also in other combinations or in and of themselves, without abandoning the scope of the present invention.

BRIEF DESCRIPTION OF THE DRAWINGS

Other objects, includes, and advantages of the present invention will be readily appreciated as the same becomes better understood after reading the subsequent description taken in connection with the accompanying drawing wherein.

DETAILED DESCRIPTION OF THE INVENTION

Figure 1:
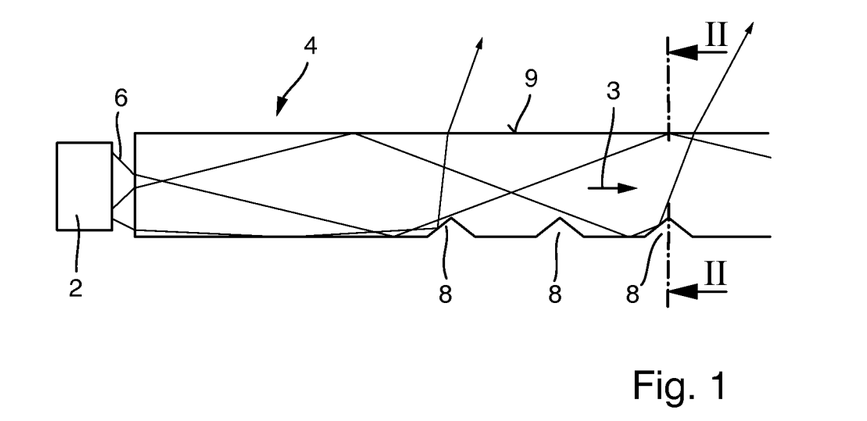
FIG. 1 shows a side view of an assembly for a light source and a rod-shaped waveguide.

Identical reference symbols in the various figures each indicate the same elements thereby, or elements having at least comparable functions. FIG. 1 shows a side view of an assembly that includes a light source 2 and a waveguide 4 at a perspective that lies transverse to a main propagation direction 3 of light in the waveguide.

The waveguide is supplied with light 6 emitted from a light source. As shown in FIG. 1, light enters the waveguide at a front surface thereof and is further conveyed in its interior, with practically no losses, by total internal reflection occurring on the walls of the waveguide. A plurality of optical emission elements 8 then deflect portions of the light such that the subsequent angle of incidence on a border surface 9 is so steep that it no longer experiences an internal total reflection there, but instead exits the waveguide and accordingly contributes to a portion of the light distribution.

Figure 2:
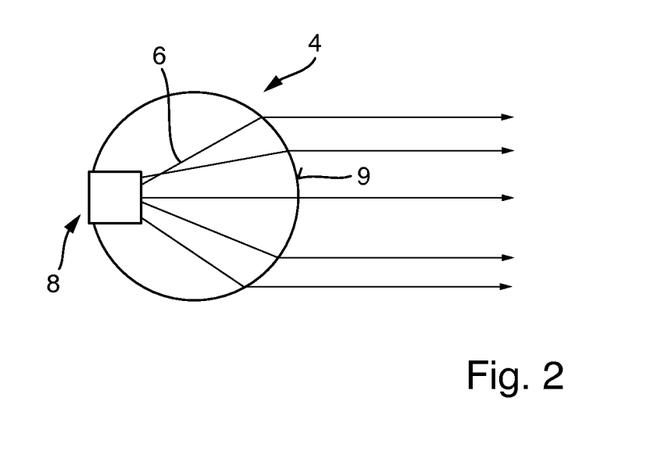
FIG. 2 shows a cross-section of a round waveguide taken along a cutting plane perpendicular to a main propagation direction of light in the waveguide.

FIG. 2 shows a cross-section of the waveguide 4 of FIG. 1 from a perspective corresponding to the main propagation direction of the light in the waveguide. Generally, the emitted light bundle needs to exhibit a smaller beam width than the light emitted from the light source. In order to concentrate the light from the light source in an angular range for a signal light distribution that conforms to government-mandated regulations, the cross-section profile of the waveguide lying transverse to the main light propagation direction of the light in the waveguide may be designed with a curvature or a radius in its front region. The front region is the region that is bordered by the light exit surface 9 of the waveguide 4. The light deflected with the emission elements 8 is bundled by the light refraction occurring in this surface 9 when the light is emitted.

Figure 3:
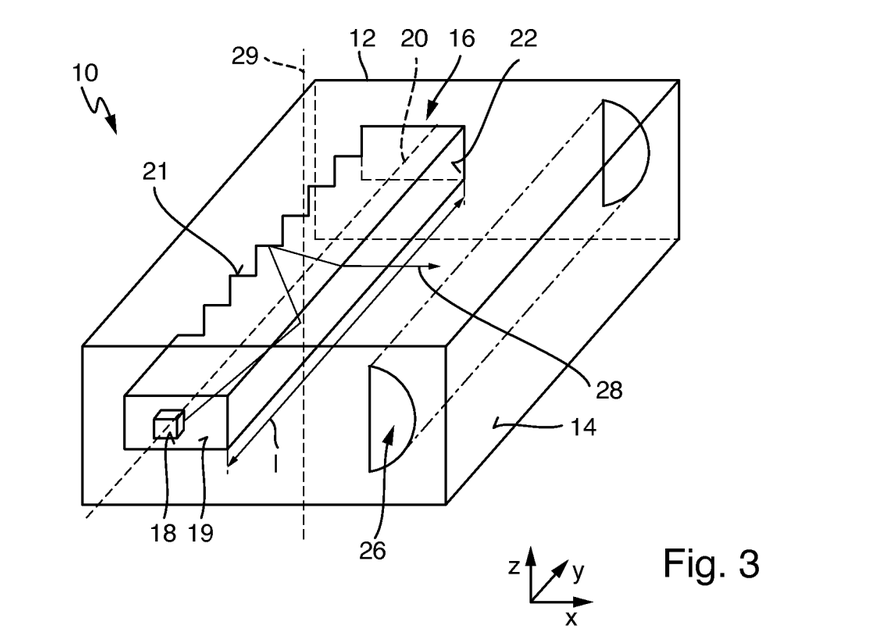
FIG. 3 shows a perspective view of a motor vehicle lamp according to one embodiment of the present invention.

FIG. 3 shows a motor vehicle lighting device 10 having a housing 12 covered by a transparent lens 14. The lighting device fulfills at least one signal function and has a light module that is configured as such, or at least contributes thereto. In addition to a light module of this type, the lighting device can have an additional light module, or numerous additional light modules, which contribute to the fulfillment of the lighting function, or fulfill the one or more additional signal light functions and/or headlamp functions. In this embodiment, the present invention relates is realized as a module that fulfills a signal light function. The lighting device 10 is therefore also referred to as a motor vehicle lamp herein.

The light module for the lighting device of FIG. 3 has an elongated waveguide 16 and a light source 18. The light source is disposed in relation to a light exit surface 19 of the waveguide such that light emitted therefrom enters the waveguide 16. The light source may be realized as a light emitting diode having a planar light exit surface, or by an assembly of numerous light emitting diodes of this type. Advantageously, the light source may be disposed at a narrow front surface 19 of the waveguide. The light emitting diode may be disposed in relation to the waveguide such that its light exit surface is perpendicular to the guidance line of the waveguide. In one embodiment, the light exit surface of the light emitting diode lies at a spacing in front of the light entry surface of the waveguide, which is smaller than 1 mm. The waveguide has emission elements 21, at which light is deflected such that it exits a light exit surface of the waveguide. The emission elements are designed such that the brightness along the waveguide appears to be as uniform as possible (also be referred to herein as a homogenous projection image).

The waveguide 16 is configured to conduct light in its interior by total internal reflection occurring on border surfaces of the waveguide along a guidance line 20 of the waveguide defined by the external shape of the waveguide and running inside the waveguide. The guidance line can be visualized as a central fiber of the waveguide and thus, represents a smoothed main light propagation direction in the waveguide. The waveguide has a light exit surface 22 via which light deflected at the emission elements 21 of the waveguide exits the waveguide. The emission elements can be prismatic, or they can also exhibit radii or free-form surfaces.

The light exit surface is straight in a spatial direction 29 lying transverse to the guidance line 20 (compare to the light exit surface 9 shown in FIGS. 1 and 2). The guidance line of the waveguide in FIG. 2 would be perpendicular to the drawing plane of FIG. 2, for example, such that each of the directions lying in the drawing plane runs transverse to this guidance line. As shown in FIG. 2, the light exit surface 9 does not run in a straight line in any of the directions lying transverse to the guidance line due to its curvature.

A decrease in the beam width for the light bundle which results with the subject matter of FIGS. 1 and 2 through the curved light exit surface is achieved according to the invention in that the lamp has a focusing element 26 which lies in the light path of the light 28 exiting via the light exit surface 22 (and thus extends thereby over the entire length 1 of the light exit surface 22) configured to reduce the beam width of the light bundle in which the light exiting the light exit surface is propagated.

The guidance line shown in FIG. 3 runs parallel to a y-axis of an initially arbitrarily defined right-handed coordinate system, which, in addition to the y-axis, also exhibits an x-axis and a z-axis. The x-axis is perpendicular to the light exit surface and the guidance line and points in the main light exit direction from the waveguide. The z-axis is perpendicular to the x-axis and the y-axis.

In particular, the invention also allows for designs with elongated waveguides, having curved guidance lines. Advantageously, the waveguide cross-sections lying transverse to the guidance line may be rectangular, wherein no reduction of the beam width for the light bundle striking the light exit surface from the interior of the waveguide occurs when the light exits the waveguide. Rather, when entering the air (which is optically thinner in comparison to the material for the waveguide), an expansion occurs. Here, a reduction of the beam width for the light bundle striking the light exit surface from the interior of the waveguide only occurs via subsequent optical elements in the light path. In particular, the reduction may occur via the focusing element 26. Here, the subsequent optical element 26 in the light path is a transparent solid and has a planar light entry surface and a light exit surface that emerges in a convex manner from the optically thinner environment, which lie in planes in the waveguide in the cross-sections lying perpendicular to the guidance line of the waveguide.

In one embodiment, the light exit surface of the waveguide, when viewed from the subsequent focusing optical elements in the light path, exhibits a convex curvature in planes lying transverse to the guidance line. Here, the reduction of the beam width for the light bundle striking the light exit surface from the interior of the waveguide is distributed to a first reduction occurring on the light exit surface and a second reduction occurring via the subsequent optical element in the light path.

Figure 4:
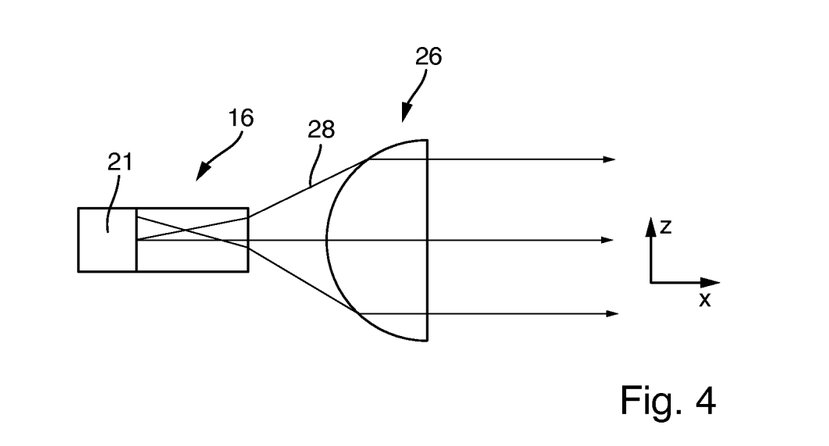
FIG. 4 shows an assembly for a waveguide having a first design for a focusing element.

FIG. 4 shows an assembly of a waveguide 16 and a subsequent focusing optical element 26 in the light path for a lighting device according to one embodiment of the present invention, having an alternative design for the subsequent optical element in the light path. Here, the subsequent optical element 26 in the light path is a transparent solid, which has a light entry surface that emerges in a convex manner from the optically thinner environment, and has a planar light exit surface, lying in planes of the waveguide in cross-sections that are perpendicular to the guidance line of the waveguide. The optical element is disposed such that it does not alter the mean propagation direction of the incident light bundle from the waveguide.

Figure 5:
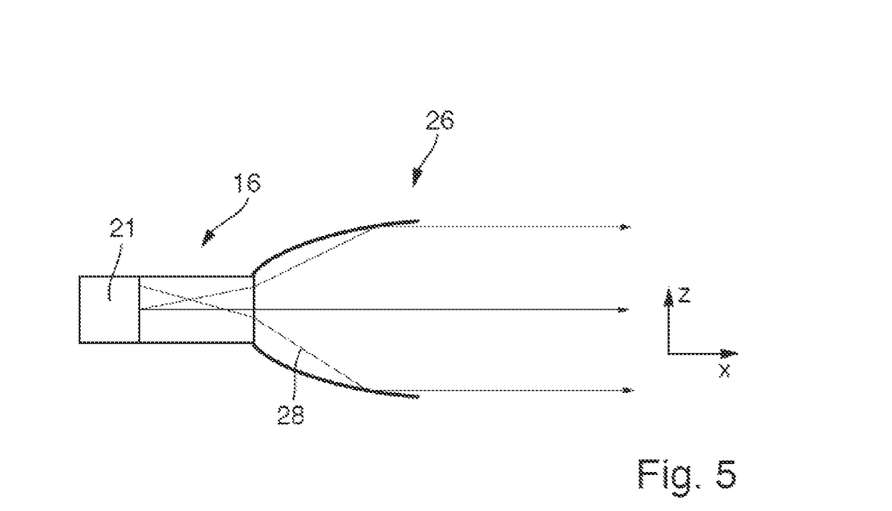
FIG. 5 shows an assembly for a waveguide having a second design for a focusing element.

FIG. 5 shows an assembly that includes a waveguide 16 and a subsequent focusing optical element 26 in the light path for a lighting device according to one embodiment of the present invention, having another alternative design for the subsequent optical element in the light path. Here, the subsequent optical element 26 in the light path is a hollow reflector, which is disposed such that it is illuminated by the light 28 emitted from the waveguide. A focal line for the reflector may run at a constant spacing to the guidance line of the waveguide thereby. Similarly, the focal line may run inside the light exit surface of the waveguide.

Figure 6A:
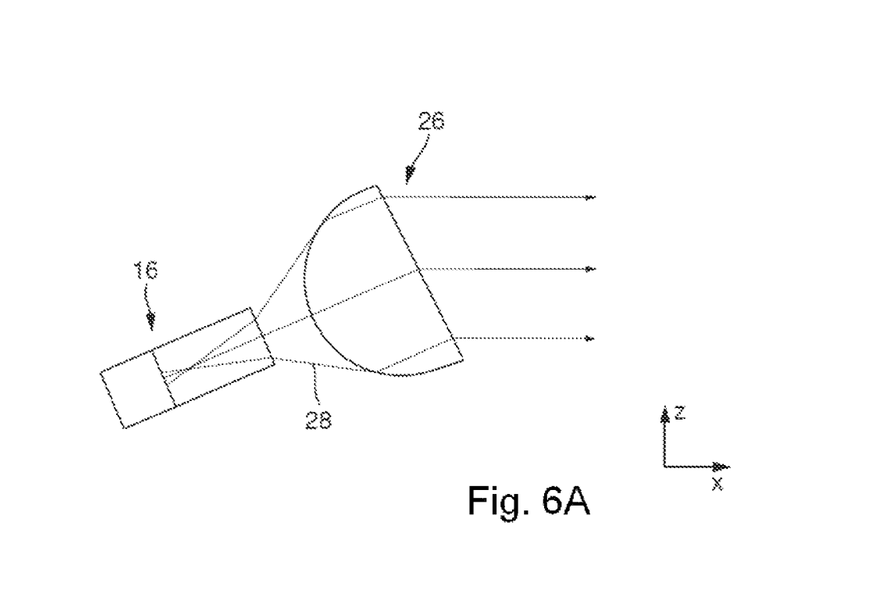
FIG. 6A shows an assembly for a waveguide having a focusing element.

FIG. 6A shows an assembly that includes a waveguide 16 and a subsequent focusing optical element 26 in the light path, for a lighting device according to one embodiment of the present invention having another alternative design of the subsequent optical element in the light path. Here, the subsequent optical element in the light path is a transparent solid, and has a light entry surface that emerges in a convex manner from the optically thinner environment, and has a planar light exit surface, in planes lying in the cross-sections of the waveguide that are perpendicular to the guidance line of the waveguide.

In comparison to FIG. 4, the optical element of FIG. 6A is disposed such that it alters the mean propagation direction of the incident light bundle 28 from the waveguide. Here, the planar light exit surface is tilted in relation to the incident light from the interior of the optical element, such that the directions of the incident light and the norm of the light exit surface are not parallel, as is the case with the subject matter of FIG. 4, but instead, they form an angle to one another not equal to zero. Independently of this embodiment, it is the case that the orientation of the focusing element is not necessarily symmetrical to the optical axis. Instead, the light exit surface of the lens can be tilted in wide ranges. It can thereby follow the freedom of design for the various styles. The waveguide 16 and the focusing light entry surface of the optical element 26 are then tilted according to the fundamental laws of refraction.

In one design, having a reflector, the reflecting surfaces thereof are implemented in a stepped manner accordingly, in order to follow the tilting. In another design, a combination including a reflector and a transparent solid form the subsequent optical element 26 in the light path. With a combination of a transparent solid and a reflector, the reflector may be white or diffused in a scattering manner. In this way, the actual light distribution, conforming to government-mandated regulations, is expanded over a homogenous background such that the lamp is also visible from spatial angular ranges that lie outside of the spatial angular range of the light distribution conforming to regulations.

Figure 6B:
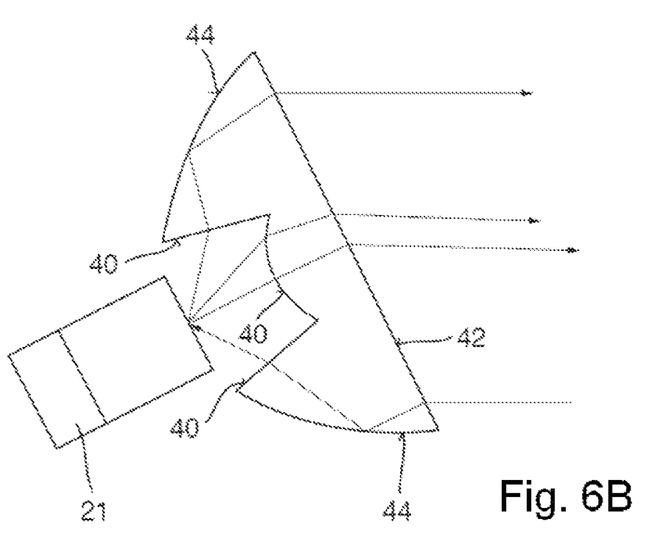
FIG. 6B shows an assembly for a waveguide having another focusing element.

The transparent solid lens may also be provided with a bundling Fresnel structure. The transparent solid can be implemented in all of the embodiment examples as a lens (light refraction at entry and/or exit, no total internal reflection) or as a waveguide (total internal reflection with or without light refraction at entry and/or exit). A design such as that depicted in FIG. 6B is advantageous, and is also referred to as a catadioptric lens. Its light entry surface 40 and the light exit surface 42 are designed such that they cause a desired light refraction when the light enters and when the light exits, as is known with a lens. The lateral surfaces 44 thereof are shaped such that internal total reflections occur thereon, which shape the incident light bundle in the manner of a hollow mirror reflector. In particular, the central region forms a lens.

Figure 7:
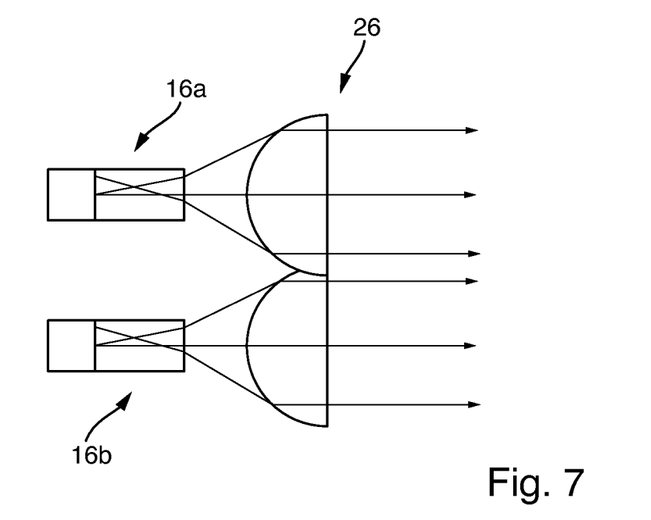
FIG. 7 shows an assembly having two waveguides with a common focusing element.

FIG. 7 shows an assembly having two waveguides 16a, 16b and a common focusing element 26 for both waveguides. FIG. 7 thus illustrates that numerous thin waveguides may run adjacent to one another, and can be mapped accordingly with the focusing element. It is thus also possible to create lamps with planar projections having improved homogeneity.

Figure 8:
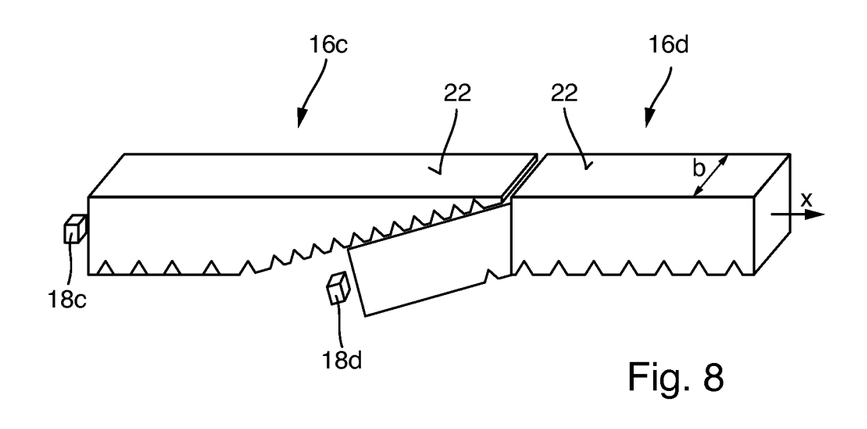
FIG. 8 shows a combination of two rectangular waveguides to form a structure longer than the lengths of the individual waveguides.

FIG. 8 shows a combination of two rectangular waveguides 16c, 16d forming a structure that is longer than the lengths of the individual waveguides. Each waveguide has its own light entry surface, in front of which a light source 18c, 18d is disposed which supplies a light to the respective waveguide. As noted above, a light source of this type may include one or more light emitting diodes having flat light exit surfaces. As is shown in FIG. 8, the light exit surfaces of both waveguides can be joined, practically without displaying a transition, to form a light exit surface 22 that appears to be coherent when projecting light. This is an advantage of the rectangular shape of the waveguide cross-section that is perpendicular to the main light propagation direction x, because this enables (due to the constant width b) a transporting of a quantity of light all the way to the end of the waveguide 18c of the two waveguides, which tapers in the direction of the light beam, which is sufficient for generating a homogenous illumination of the light exit surface all the way to the end facing the other waveguide 18d.

Figure 9:
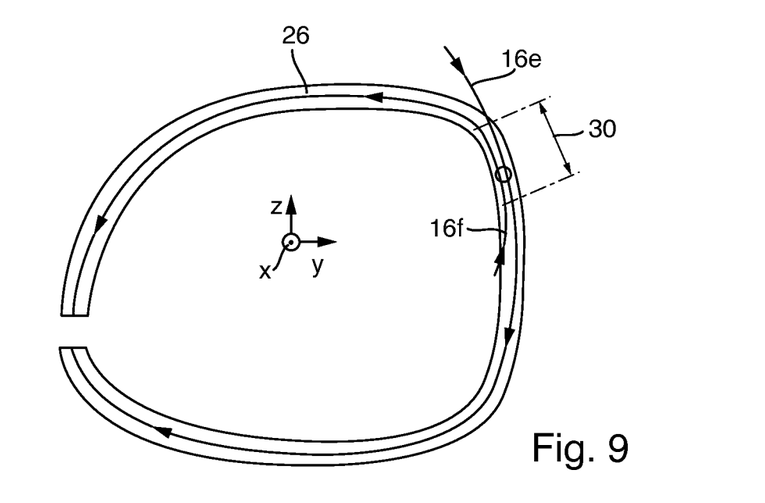
FIG. 9 shows a view of an illuminating light exit surface of a focusing element in an assembly that includes two waveguides with a common focusing element.

FIG. 9 shows a view of the luminous light exit surface of a focusing element in an assembly that includes two waveguides and a common focusing element for both waveguides. In contrast to FIG. 3, FIG. 9 corresponds to the negative x-axis. In particular, FIG. 9 shows two waveguides 16e, 16f running behind the focusing element 26, in which the light is propagated in opposing directions, which run, at least in sections, in section 30 in the case of FIG. 9, adjacent to one another. In one embodiment, the lamp has two waveguides running behind the focusing element 26, in which the light is propagated in opposing directions, which run at least in sections adjacent to one another, wherein the waveguides pass one another tangentially in opposing directions. As discussed below, it is possible thereby to obtain a uniform illumination over the entire annular contour.

Figure 10:
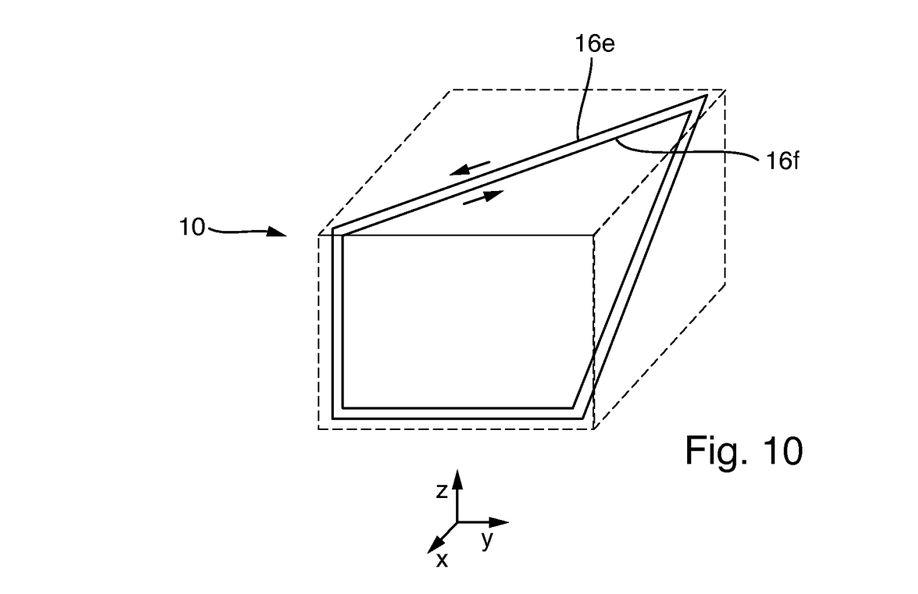
FIG. 10 shows a spatial depiction of a possible course for an assembly in a left-side front headlamp.

FIG. 10 shows a spatial depiction of a possible course in space for an assembly of this type in an assembly in a left-side front headlamp. Here, the x-axis corresponds to the direction of travel parallel to the longitudinal axis of the vehicle, the y-axis is parallel to the transverse axis of the vehicle toward the left, and the z-axis is parallel to the vertical axis of the vehicle, extending upward. The lamp has a waveguide structure, which forms a closed loop with two parallel waveguides running past each other in space. A portion of the structure runs in a first plane that is parallel to the y-z plane. Another portion runs in a plane parallel to the x-z plane, and another portion runs in a third plane, parallel to the x-y plane. The main beam direction should point along x-axis in all three portions. The waveguide structure is formed by two waveguides 16e, 16f, which run adjacent to one another in at least the second plane and the third plane, and in which the light is propagated in opposing directions.

An emission in the desired x-axis occurs in a comparably more efficient manner if the light in the waveguide that is to be emitted contains a directional component pointing along the x-axis, and occurs in a comparably less efficient manner if the light in the waveguide that is to be emitted contains a directional component pointing along the negative x-axis. Thus, the light propagated in the waveguide structure in the clockwise direction can be emitted along the x-axis less efficiently in the x-y plane than in the x-z plane. As a result, an inhomogeneous projection image for the observer is obtained, in which the structure lying in the x-y plane is less bright. Similarly, the light propagated in the waveguide structure in the counter-clockwise direction can be emitted along the x-axis less efficiently in the x-z plane than in the x-z plane. As a result, an inhomogeneous projection image for the observer is obtained, in which the structure lying in the x-z plane is less bright.

Because the waveguide structure exhibits waveguides running adjacent to one another in these planes, in which the light is propagated in opposing directions, the inhomogeneities counterbalance one another: The waveguide in which the light is propagated in the clockwise direction appears to be brighter there, where the other waveguide appears to be less bright, and vice versa. FIG. 10 shows a design in this regard, where the lamp has two waveguides running in the direction of the light exiting the waveguides in front of the focusing element, in which the light is propagated in opposing directions, and which run, at least in one section of their lengths, adjacent to one another, wherein the waveguides pass one another tangentially in opposite directions.

Figure 11:
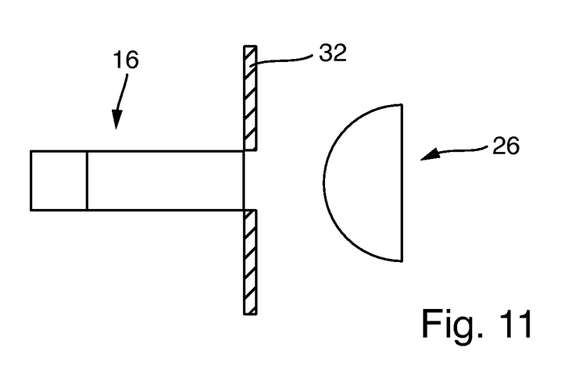
FIG. 11 shows a side view of the assembly of FIG. 4 with an additional aperture.
Figure 12:
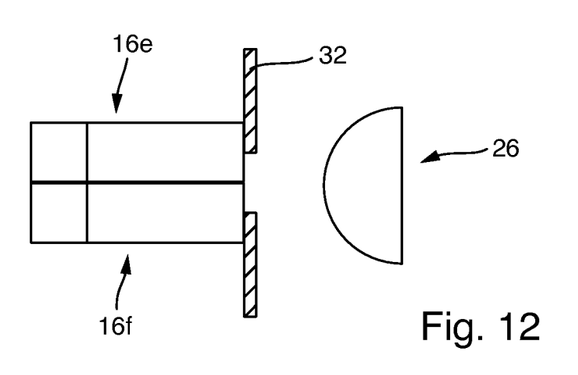
FIG. 12 a side view of an assembly having an aperture and with two rectangular waveguides passing by one another.

FIG. 11 shows a side view of FIG. 4 together with an additional aperture 32, and FIG. 12 shows a side view of an assembly that includes rectangular waveguides 16e, 16f passing by one another, with an aperture 32.

Because the waveguides in the lamp according to the present invention can be thinner than with the prior art has the large advantage with the adjacent positioning that the waveguides can have smaller radii, thus requiring less installation space. Similarly, where waveguides are rectangular in their cross-sections perpendicular to the main light propagation direction, two waveguides can run adjacent to one another and their combined light emission looks exactly like the light emission from a single waveguide. The uniform impression can be further improved if a uniform slot aperture is used, which is open to exactly the same width at the location where the waveguide structure of a lamp according to the invention includes only one waveguide as at the location where two waveguides of the waveguide structure run adjacent to one another at the smallest possible spacing.

FIGS. 11 and 12 illustrate a design in which the lamp has a slot aperture having an elongated opening which runs over the section of the length of the two waveguides passing by one another in front of the light exit surface. The opening of the slot aperture also runs thereby outside of the section in front of the light exit surface of at least one of the two waveguides. The opening of the slot aperture has a constant width over the length of the opening.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A motor vehicle lamp having a first elongated waveguide and a second elongated waveguide, and a common focusing element for both waveguides, wherein each of the waveguides is configured to conduct light in its interior via total internal reflection occurring on border surfaces of the waveguides, along a guidance line of each of the waveguides, predefined by an external shape of each of the waveguides and running inside each of the waveguides, wherein each of the waveguides has a light exit surface, and wherein the focusing element lies in a light path of light emitted via the light exit surface of each of the waveguides, and extends thereby over an entire length of the light exit surface of each of the waveguides and is configured to reduce the beam width of the light bundle in which light emitted from the light exit surface of each of the waveguides is propagated, wherein the light exit surfaces of each of the waveguides run in a straight line in a spatial direction lying transverse to the guidance line of each of the waveguides, wherein cross-sections of each of the waveguides lying transverse to the guidance line of the respective waveguide are rectangular, and wherein each of the waveguides has its own light entry surface, in front of each of which a light source is disposed, supplying light into the respective waveguide, and wherein the first elongated waveguide runs in at least one section tangentially adjacent along the second elongated waveguide and wherein the light is propagated in the first elongated waveguide in a clockwise direction and the light is propagated in the second elongated waveguide, in the at least one section tangentially adjacent along the first elongated waveguide, in a counterclockwise direction opposing the clockwise direction in the first elongated waveguide.

2. The lamp as set forth in claim 1, wherein the common focusing element in the light path is a transparent solid, and contains a planar light entry surface and a light exit surface emerging in a convex manner from an optically thinner environment in planes lying in the cross-sections of each of the waveguides that are perpendicular to the guidance line of the respective waveguide.

3. The lamp as set forth in claim 1, wherein said common focusing element in the light path is a transparent solid, and contains a light entry surface that emerges in a convex manner from an optically thinner environment, and a planar light exit surface, in planes lying in the cross-sections of each of the waveguides that are perpendicular to the guidance line of the respective waveguide.

4. The lamp as set forth in claim 1, wherein the common focusing element in the light path is a hollow reflector, which is disposed such that it is illuminated by light emitted from the waveguides.

5. The lamp as set forth in claim 1, wherein said common focusing element in the light path is configured and disposed such that it does not alter a mean propagation direction of an incident light bundle from the waveguides.

6. The lamp as set forth in claim 1, wherein said common focusing element in the light path is configured and disposed such that it alters a mean propagation direction of an incident light bundle from the waveguides.

7. The lamp as set forth in claim 1, wherein said common focusing element in the light path is a combination of a reflector and a transparent solid.

8. The lamp as set forth in claim 7, wherein the reflector has a white or diffuse scattering reflection surface.

* * * * *